(No Model.) 2 Sheets—Sheet 1.
M. J. OWENS.
DEVICE FOR REMOVING MOIL FROM BLOWPIPES.
No. 515,838. Patented Mar. 6, 1894.
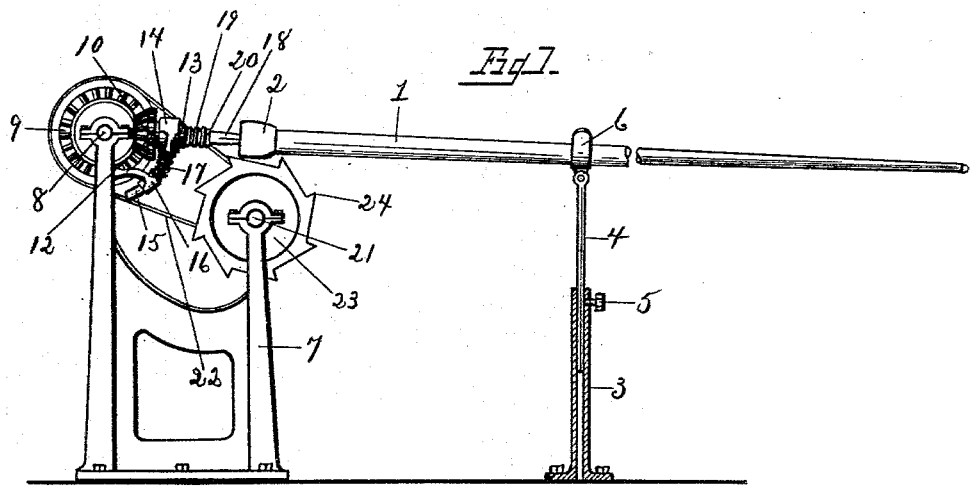
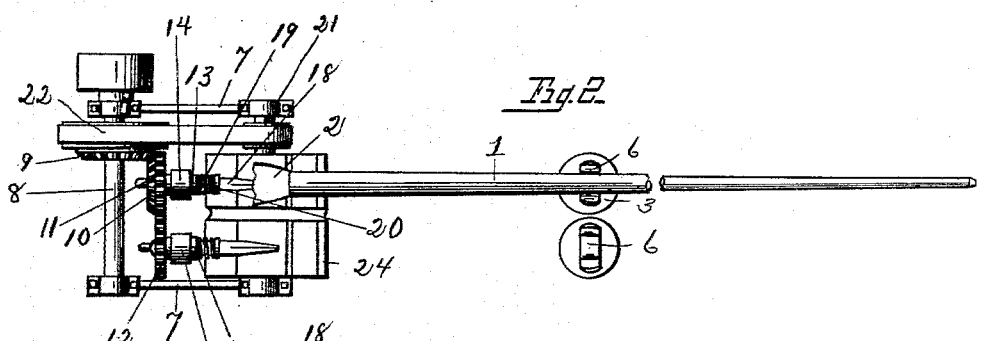
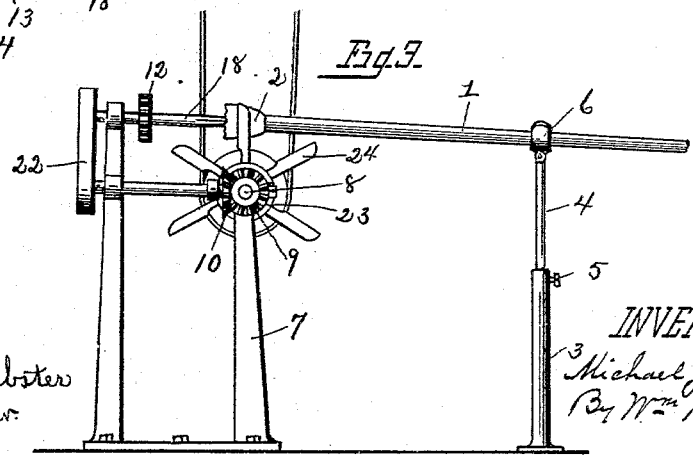
WITNESSES
Carroll J. Webster
Floyd R. Webster
INVENTOR
Michael J. Owens
By Wm Webster
Atty (No Model.) 2 Sheets—Sheet 2.

M. J. OWENS.
DEVICE FOR REMOVING MOIL FROM BLOWPIPES.

No. 515,838. Patented Mar. 6, 1894.

WITNESSES
Carroll J. Webster.
Floyd R. Webster.

INVENTOR
Michael J. Owens
By William Webster
Atty

UNITED STATES PATENT OFFICE.

MICHAEL J. OWENS, OF TOLEDO, OHIO.

DEVICE FOR REMOVING MOIL FROM BLOWPIPES.

SPECIFICATION forming part of Letters Patent No. 515,838, dated March 6, 1894.

Application filed February 25, 1893. Serial No. 463,705. (No model.)

*To all whom it may concern:*

Be it known that I, MICHAEL J. OWENS, of Toledo, county of Lucas, and State of Ohio, have invented certain new and useful Improvements in Devices for Removing Moil from Blowpipes; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to the art of blowing glass, and has for its object to mechanically remove the moil or glass deposit from the blow pipe after the article has been manufactured.

With this object in view, the invention consists broadly in mechanical means for automatically removing the moil from a blow pipe.

Heretofore in the art of blowing glass, there has been required the services of an assistant, whose duty has been to receive the pipe from the blower, and remove the moil manually. One feature of my invention comprehends means for dispensing with the expense of this assistant by accomplishing the work heretofore performed by him mechanically. Another object being a more satisfactory accomplishment of the work.

As the invention is capable of being carried out in a variety of ways, I have illustrated several modes which I wish to be considered as merely diagrammatic of preferred means, and while describing the invention in modified forms, I wish it to be understood that I may vary the same widely without departing from the spirit of my invention.

Figure 4:
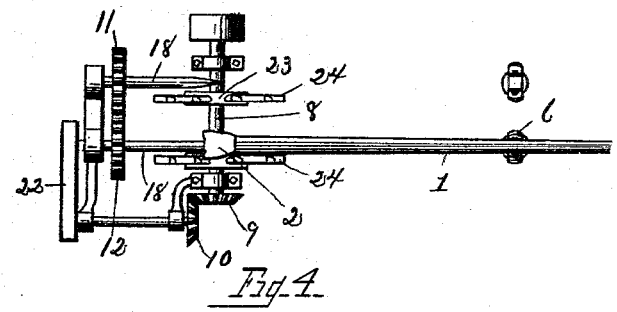
Figure 5:
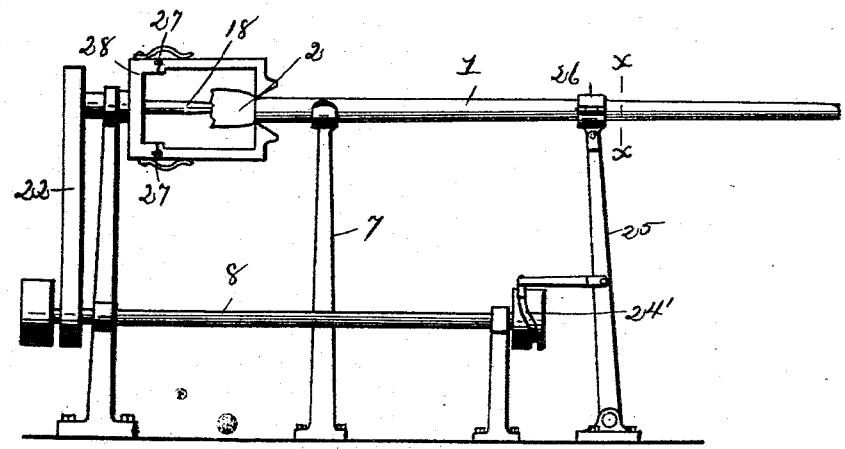
Figure 6:
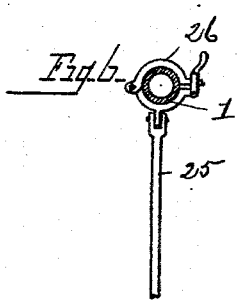

Figure 1 is a side elevation, and Fig. 2 a plan view of a machine for carrying out my invention. Fig. 3 is a side elevation, and Fig. 4 is a plan view of a modified form of mechanism, and Fig. 5 a side elevation of a further modification. Fig. 6 is a cross sectional view on lines X—X, Fig. 5, showing the clamp for grasping the blow pipe.

In the operation of glass blowing, the glass blower inserts the end of the blow pipe into the molten glass, and forms the desired article by inflating the glass by blowing through the tube after which the article is separated from the blow pipe, leaving however a deposit of glass upon the end of the pipe, which must be removed before again inserting the end of the pipe into the viscid glass. This removal of the glass deposit has heretofore been accomplished by an assistant, to whom the glass blower passes the blow pipe, after the article has been separated, who removes the deposit by repeated blows with what is called a knife. By means of my invention this removal of the deposit is accomplished mechanically, the blow pipe being placed upon a rest by the glass blower, and either the knives revolved upon an axis transversely to the pipe, and the pipe revolved, or the knives revolve upon an axis coincident with the pipe, with means for causing a longitudinal impact upon the glass deposited thereon.

1 designates the blow pipe, and 2 the deposit of glass thereon, which it is desired to remove.

In the mechanism employed in Figs. 1 and 2, the pipe is supported upon a rest comprising a hollow base 3, and a telescoping standard 4, secured in any desired adjustment by thumb screw 5, the upper end of the standard being forked as at 6, to receive the blow pipe.

7 designates the frame, in which is journaled a power shaft 8, having a bevel gear 9 secured thereon, which meshes with a bevel gear 10, having a square faced gear 11 journaled axially at right angles to shaft 8, there being a gear 12 meshing with gear 11 whereby the two move simultaneously. Gears 11 and 12 are each formed with elongated hub portions 13 which are journaled in bearings 14 of arms 15. Arms 15 are allowed a movement in bracket 16 in which they are secured to allow the gears to swing in the arc of a circle of the radius of bevel gear 9, and is normally forced by means of spring 17 to cause the hub portions to project above a line parallel with the blow pipe when in rest.

18 designates spindles tapered at one end and rectangular in cross section, the rear ends being inserted in the hub portions of the gears, (which hubs are formed with rectangular central openings to receive the same) and the outer ends projecting beyond the hubs to allow of inserting the extreme end of the end of the blow pipe to cause the pipe to revolve in unison with the spindle. In order to allow the spindles to move slightly when contacted with, to avoid unnecessary jar there is a coiled spring 19 upon each spindle, the back end of which abuts against the end of the hub, and the front end against a washer 20 secured on the spindle, so that the spindle has normally a yielding rearward motion of slight degree.

21 designates a shaft journaled in frame 7 in parallel relation with shaft 8, and receives motion therefrom through the medium of belt 22. Secured upon shaft 21 is a knife wheel 23, the knives 24 of which are of a length to trim the glass deposit from the pipe.

In operation the glass blower causes the end of the spindle to enter the end of the blow pipe, and rests the pipe in fork 6 of the standard, when the pipe is revolved in a horizontal plane and the knife wheel in a vertical plane, causing a new surface of the deposit to be presented to the revolving knives, and the deposit is speedily removed, when upon the withdrawal of the pipe from the spindle inclines slightly from a horizontal and another pipe is put in position.

In the form of mechanism shown in Figs. 3 and 4, the power shaft 8 is provided with miter gear 9, into which miter gear 10 meshes, and power is transmitted therefrom by belt 22 which through the medium gears 11 and 12 revolve the spindle 18, the knife wheels 23 being upon the power-shaft, and the operation is the same.

In the mechanism shown in Fig. 5 the power shaft 8 has an eccentric groove 24', which gives a reciprocatory movement to a pivoted standard 25, which has a clamp 26 at its upper end, which grasps the pipe and gives a reciprocatory movement to the same. In this construction the knives are stationary with relation to longitudinal movement, but have a revoluble movement to present the same to all sides of the pipe, therefore the spindle 18 is round instead of square, and serves to form a bearing for the end of the pipe. The knives in this construction are pivoted at 27 to a cross piece 28 revolved by belt shaft 8 through the medium of belt 22, there being springs which project the knives onto the pipe, and will also allow of the knives opening when the pipe is to be inserted. It will be also seen that I may also revolve and move the pipe longitudinally, removing the moil by means of a stationary knife without departing from the spirit of my invention.

What I claim is—

1. In a device for removing the moil from a blow pipe, a support for the blow pipe, a revoluble knife wheel adapted to engage the moil and cut it from the pipe, and the revoluble spindle adapted to enter and revolve the pipe, whereby all portions of the pipe are exposed to the action of the knife.

2. In a device for removing the moil from a blow pipe, a power shaft, spindles connected therewith and revolved thereby a knife shaft and a knife wheel mounted thereon, said shaft being connected with the power shaft, whereby the knife wheel is revolved to contact with the moil on the blow pipe.

3. In a device for removing the moil from a blow pipe, the power and knife shafts connected as described, the spring supported spindles connected with the power shaft and adapted to be revolved, the knife wheel and the blow pipe support for holding the pipe in position while the knife wheel cuts the moil therefrom.

In testimony that I claim the foregoing as my own I hereby affix my signature in presence of two witnesses.

MICHAEL J. OWENS.

Witnesses:
FLOYD R. WEBSTER,
WILLIAM WEBSTER.